United States Patent [19]

Ingalls et al.

[11] Patent Number: 5,556,522
[45] Date of Patent: Sep. 17, 1996

[54] FILTER ASSEMBLY

[76] Inventors: Rex K. Ingalls, 1520 Lake Christopher Dr., Virgina Beach, Va. 23464; Harold H. Casey, 1105 Stoney Brook Landing, Chesapeake, Va. 23320; Rodger T. Moloney, 1400 London Blvd., Portsmouth, Va. 23704

[21] Appl. No.: 300,039

[22] Filed: Sep. 2, 1994

Related U.S. Application Data

[63] Continuation of Ser. No. 128,607, Sep. 29, 1993, abandoned, which is a continuation-in-part of Ser. No. 920,853, Jul. 28, 1992, abandoned.

[51] Int. Cl.$^6$ .................................................. C25B 9/00
[52] U.S. Cl. ........................ 204/269; 204/276; 204/228
[58] Field of Search .................................... 204/264, 270, 204/302, 276, 286, 305, 284, 269, 276, 228; 210/335, 323.1

[56] References Cited

U.S. PATENT DOCUMENTS

| | | | |
|---|---|---|---|
| 4,350,590 | 9/1982 | Robinson | 210/243 |
| 4,594,138 | 6/1986 | Thopmson | 204/302 |
| 4,961,845 | 10/1990 | Dawson et al. | 210/85 |

*Primary Examiner*—Kathryn Gorgos
*Attorney, Agent, or Firm*—Greenblum & Bernstein, P.L.C.

[57] ABSTRACT

A filter assembly for an electrostatic filter for removing solid contaminants in parts-washing solvents and other fluids is disclosed. The filter assembly provides a back flushable filter pack for continual use. When the flow of cleaned fluid slows, a simple procedure of back flushing will give user full flow and complete filtration again. This provides continual use by cleaning clogged porous filter media without the expense of a new filter pack each time it clogs with contaminant. The filter pack provides a stacked array of alternatingly charged electrode plates sandwiched between porous filter media. Appropriate electrical connections are disclosed and an electric monitoring circuit for monitoring the condition of the electrostatic filter is also disclosed.

10 Claims, 10 Drawing Sheets

FILTER ASSEMBLY

This is a continuation of U.S. patent application Ser. No. 08/128,607, filed Sep. 29, 1993, now abandoned, which is a continuation-in-part of U.S. patent application Ser. No. 07/920,853, filed Jul. 28, 1992, now abandoned, the disclosures of both being herein incorporated by reference in their entireties.

BACKGROUND OF THE INVENTION

1. Field of the Invention

The present invention relates to an apparatus and method for filtering particulate matter from dielectric fluids, and in particular, for filtering particulate matter from parts-washing solutions and similar fluids.

2. Discussion of the Prior Art

Mechanical filters, comprising screens, meshes, or other porous barriers, have long been used to remove impurities from oil. An inherent problem with such mechanical filters is that they are only capable of removing (i.e. capturing) particulate matter which is larger than the openings in the filter. Particulate matter which is smaller than the openings in the filter simply pass through the openings in the filter and continue to contaminate the fluid. When used with most oils, the practical lower limit to the size of filter openings typically has been found to be five microns (0.0002 inches) or larger. In order to remove smaller particles, the filter media must be so dense (i.e. the openings in the filter must be so small) and thick that extremely high pressures must be used to force the fluid through the filter. It has been found that in most parts-washing applications, most of the solid contaminants suspended in oils are smaller than five microns (0.0002 inches). In other words, the particulate sizes that are most plentiful in typical contaminated parts-washing fluids, and which are capable of doing extensive damage to machinery, are smaller than the smallest openings in common mechanical filters and, accordingly, pass through such filters.

It is well known in the art to remove contaminants from parts-washing solvents, hydraulic fluids, and other dielectric fluids electrostatically. Electrostatic filters remove solid contaminants that are extremely small (down to sub-micron range) while not requiring high fluid pressures which would be necessary, for example, in mechanical filtering systems. Electrostatic filtration may also remove tars, varnishes, and some acids. Electrostatic fluid filters work by passing contaminated fluid over or through a plurality of alternately charged electrodes. The electrodes are alternately charged positive and negative, or are alternately energized by high voltage and grounded. In the prior art porous filter media are disposed intermediately between adjacent electrodes for trapping particulate matter. One such system is described in U.S. Pat. No. 4,594,138, issued Jun. 10, 1986 to Thompson. The Thompson filter utilizes electrostatic filtration in a cylindrical filter housing having an external electrical bus for connecting the electrodes.

A problem with prior electrostatic filters, such as the Thompson filter, is that over time the trapped particles within the porous filter media (typically constructed of paper, foam, or other suitable material) clog and diminish the efficiency of the filter, or clog and stop filtration altogether. When the efficiency of such prior filters becomes sufficiently low, it typically becomes necessary to shut down the entire filtration system, disassemble the filter device, remove the filtering media, install new filtering media, and then reassemble the device.

Another problem with such prior devices is that the efficiency of the filtering media cannot be easily determined without disassembling the filtering device and visually inspecting the filtering media.

Another problem with such prior electrostatic filtering devices is that they typically are complicated in design and, correspondingly, are difficult to manufacture and maintain.

SUMMARY Of THE INVENTION

Accordingly, it is an object of the present invention to provide a low cost, low maintenance electrostatic filter apparatus which can be used in conjunction with parts washing fluid systems.

It is another object of the present invention to provide a filter apparatus of the character described and a method which provides an economical way of reusing the filtering media, and which allows for continual use of the filtering system.

It is another object of the present invention to provide a filter apparatus and method of the character described in which the direction of fluid flow may be reversed within the filtering apparatus (i.e. "back flushing") so as to clean the filter media within the housing of the apparatus, without requiring disassembly of the filter apparatus, thereby enabling virtually continuous filtration and reuse of the filter media without the cost of replacement filter packs.

It is another object of the present invention to provide a filter apparatus of the character described comprising replaceable filter packs.

It is another object of the present invention to provide a filter apparatus of the character described in which the status of the electrostatic fluid filter media may be constantly monitored so as to indicate the efficiency of the apparatus and so as to indicate the optimal time to back flush the apparatus.

It is a further object of the present invention to provide a filter apparatus of the character described which is uncomplicated in design, utilizes low pump pressure, and is easily transported and adapted to a filter process for the complete cleaning of parts washer solvents and other fluids.

It is a further object of the present invention to provide a filter apparatus of the character described in which all of the electrical circuitry and all of the filtering media are enclosed within single housing.

It is a still further object of the present invention to provide a filter apparatus of the character described in which the filtering media are physically isolated from the electrical control circuitry and fluid pumping equipment in a watertight chamber.

It is a further object of the present invention to provide a filler apparatus of the character described in which virtually all of the fluid introduced into the apparatus must pass through the filtering media before being discharged from the apparatus.

It is a still further object of the present invention to provide a filter apparatus of the character described wherein the filtering media and the electrostatically charging plates (i.e. electrodes) are modularly constructed, thus facilitating easy assembly, disassembly, modification of the apparatus and component interchangability.

It is another object of the present invention to provide a filter apparatus of the character described in which the electrical conductors which extend between alternating parallel plates (i.e. electrodes) are sufficiently electrically insulated to prohibit arcing between said conductors and said electrodes as the filtering media become inundated with electrically conductive contaminants.

Further objects and advantages of my invention will become apparent from a consideration of the drawings and ensuing description thereof.

DESCRIPTION OF THE PREFERRED EMBODIMENT

In order to clearly disclose the construction of the preferred embodiment of the present invention, the following disclosure describes the construction and use an electrostatic filter apparatus which may ideally be used in conjunction with "parts washing" systems. The term "parts washing" as used herein refers to systems in which dirt, grease, metal, graphite and other contaminants are cleaned from small and medium sized mechanical components, primarily automotive components, such as gears, shafts, bearings and the like, with a low viscosity solvent (such as VARSOL which is a straight petroleum aliphatic solvent). Typically, in such "parts washing" systems, the same solvent may be reused many times to wash or clean numerous parts. The present invention is particularly well suited to filtering (i.e. cleaning) the used solvent in such "parts washing" systems; however, as will be apparent from an understanding of the following disclosure, the present invention has application to filtering systems other than "parts washing" systems and with many solvents other than VARSOL.

Figure 1:
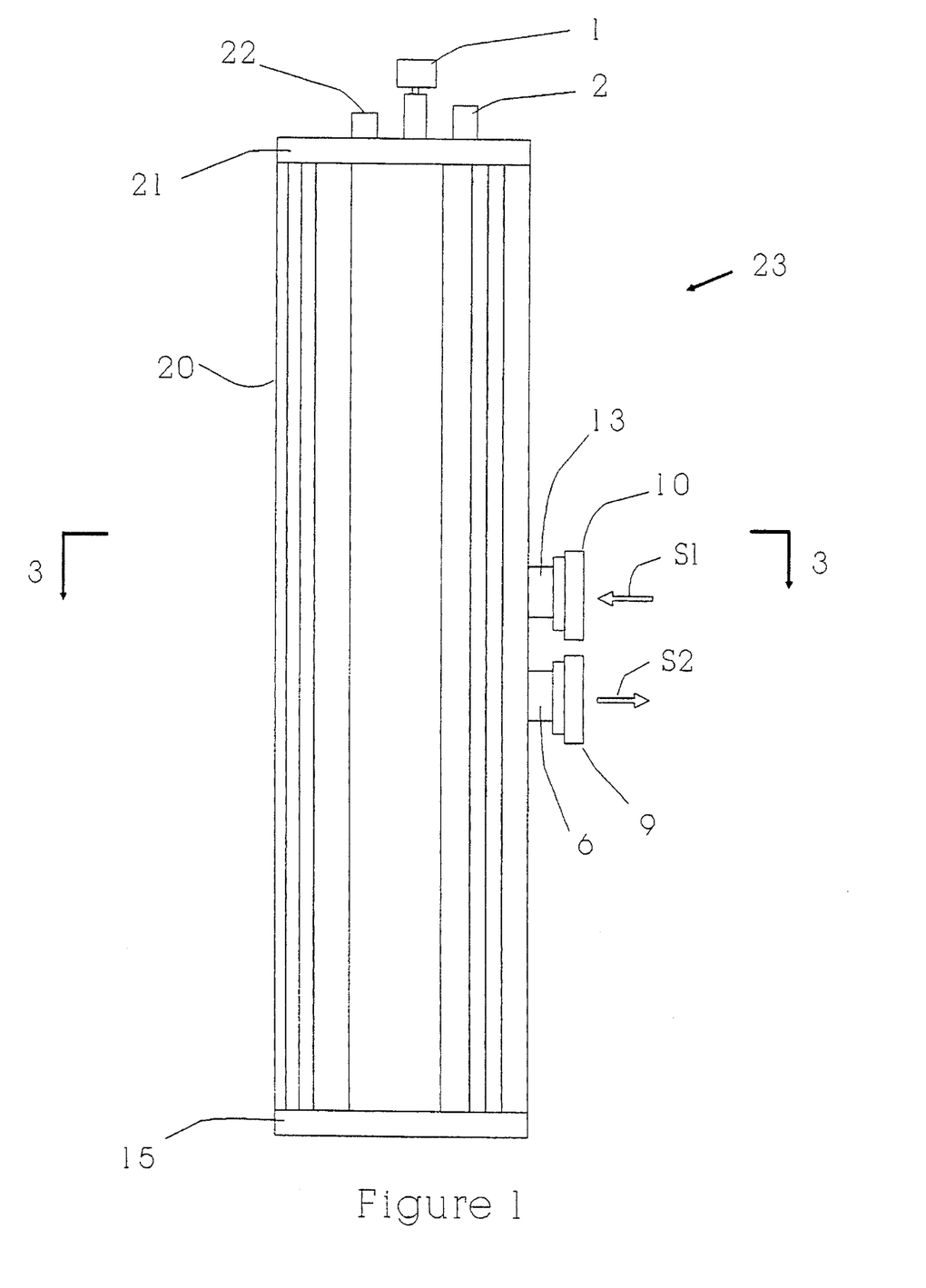
FIG. 1 is a front elevation of the filter assembly of the present invention.
Figure 2:
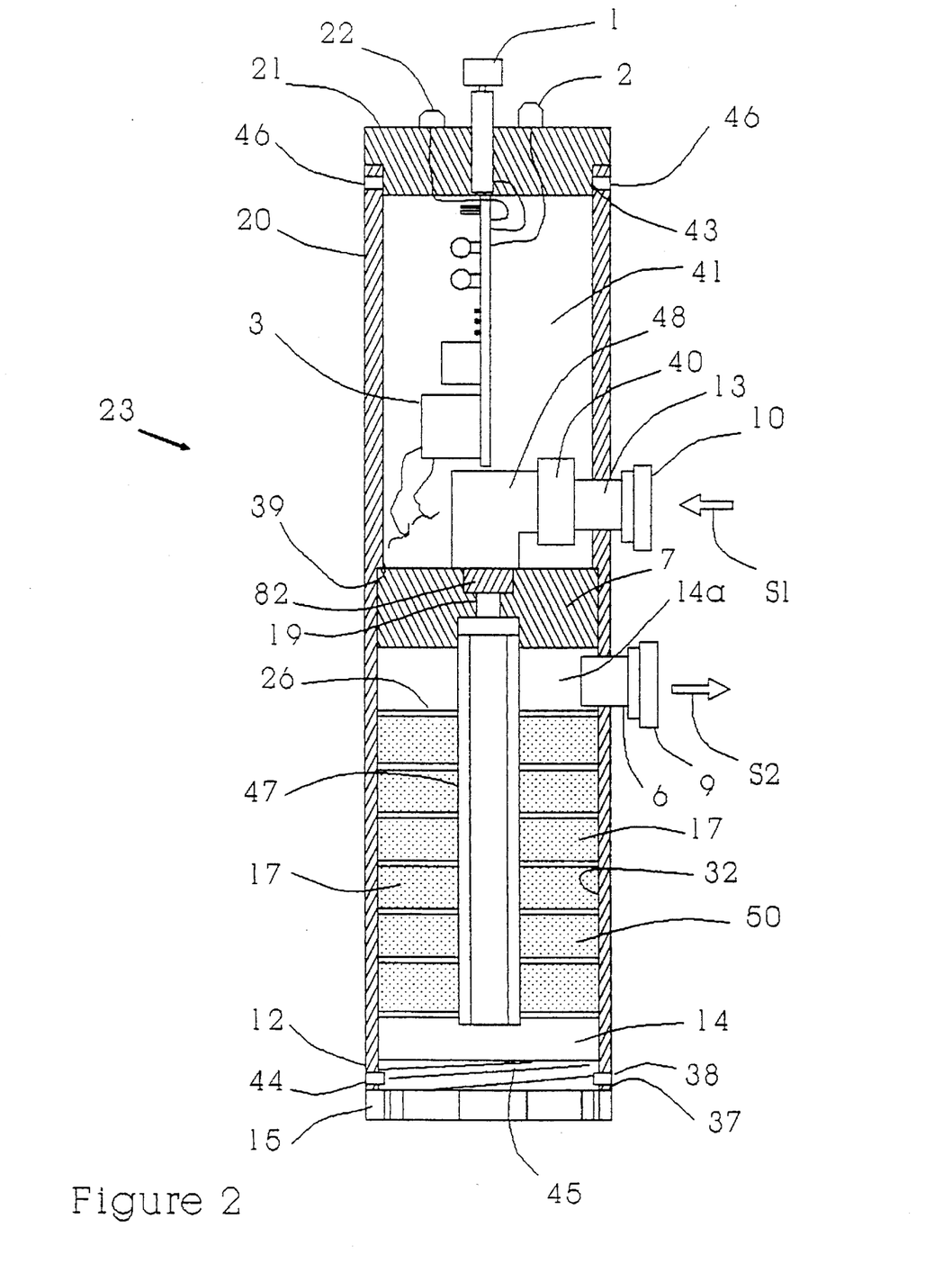
FIG. 2 is a medial cross-sectional view of the filter apparatus of the present invention, showing the flow of solvent and the relationship of electrical communication to the power supply.
Figure 3:
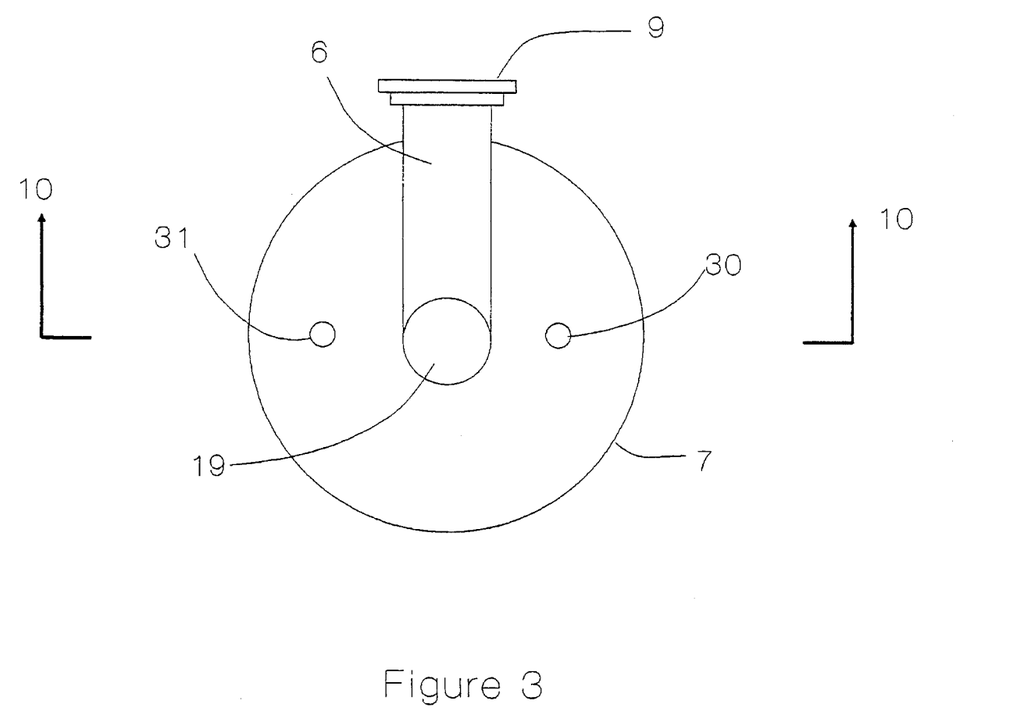
FIG. 3 is a cross-sectional view taken along the line 3—3 of FIG. 1 showing details of construction of the bulkhead of the present invention.

With reference to FIGS. 1 and 2, the filter assembly (generally indicated as 23 in the figures) has a housing 20 preferably constructed from a single continuous length of schedule 40 or schedule 80 polyvinyl chloride (PVC) pipe having a removable upper end cap 21 and a lower end cap 15. A one-inch thick internal bulkhead 7 effectively divides the interior of the housing into an upper interior chamber 41 and a lower interior chamber 14. In the preferred embodiment of the invention, the bottom of the cylindrical housing 20 is provided with female threads 44 which are adapted to engage with male threads 45 of the lower end cap 15. An O-ring 38 is positioned against the lower end cap's shoulder 37, thus effecting a water-tight seal when the lower end cap 15 is tightly screwed onto the cylindrical housing 20. The upper end 43 of the cylindrical housing is preferably bored out to accommodate insertion of the upper end cap 21. The upper end cap 21 is firmly secured to the top of the cylindrical housing 20 by two set screws 46. The set screws 46 are preferably headless so as to permit flush mounting of the set screws 46. A wax coating (not shown) may be applied to the set screws 46 after the screws are tightened so as to deter unauthorized removal of the upper end cap 21. It will be understood form the foregoing that, when assembled, the body (comprising the cylindrical housing 20, upper and lower end caps 21 and 15, and internal bulkhead 7) of the filter assembly is a closed, dual-chamber container.

Continuing now with reference to FIGS. 1 and 2, the upper end cap 21 is relieved in three exact points to accept the fuse body 22 with fuse, the illuminated switch 1, and condition light 2. The illuminated power switch 1 preferably remains lighted as long as the filter assembly 23 is energized. When the filter assembly 23 is energized, the condition light 2 constantly glows until the filter media 17 become clogged. When the filter media 17 become clogged, the condition light 2 extinguishes, signaling the filter assembly 23 needs to be "back flushed" as described below.

As shown in FIG. 2, an internal bulkhead 7, which is preferably constructed of 1" thick PVC, is secured to the inside of the cylindrical housing 20, sealing the upper and lower interior chambers 41 and 14, respectively, from each other. In the preferred embodiment of the invention, the inside diameter of cylindrical housing 20, from the bottom 12 of the housing to the interior shoulder 39, is machined so as to be circular in cross-section within plus or minus 0.002 inches of a true circle. The outside diameter of the internal bulkhead 7 is preferably machined so as to form a press fit with machined interior wall 32 of the housing. In some embodiments of the invention, it may be advantageous to additionally cement the bulkhead 7 to the cylinder's interior wall 32.

Inlet piping 13 passes through the cylindrical housing 20 in the upper interior chamber 41, and enters pump 40 which is housed in the upper interior chamber 41. Piping 48 from the pump 40 is connected to solvent channel 19 in the bulkhead 7 via pipe fitting 82. The lower chamber piping 47, which is in fluid communication with the solvent channel 19 in the bulkhead 7, extends downward from the bulkhead 7 through the entire filter element sub-assembly 50. An O-ring 83 which is fitted into a groove 84 in the top of the lower chamber piping 47 helps secure the lower chamber piping to the bulkhead 7 and provides a water tight seal around the lower chamber piping 47. The lower chamber piping 47 is preferably constructed of polyvinyl chloride, or other electrically non-conductive material. It will be understood from the foregoing description that the inlet piping 13, the internally housed pump 40, the pump piping 48, the fitting 82, the solvent channel 19, and the lower chamber piping 47 provide a continuous fluid conduit for contaminated solvent S1 from the quick disconnect 10 to the lower chamber 14 of the apparatus.

Figure 12:
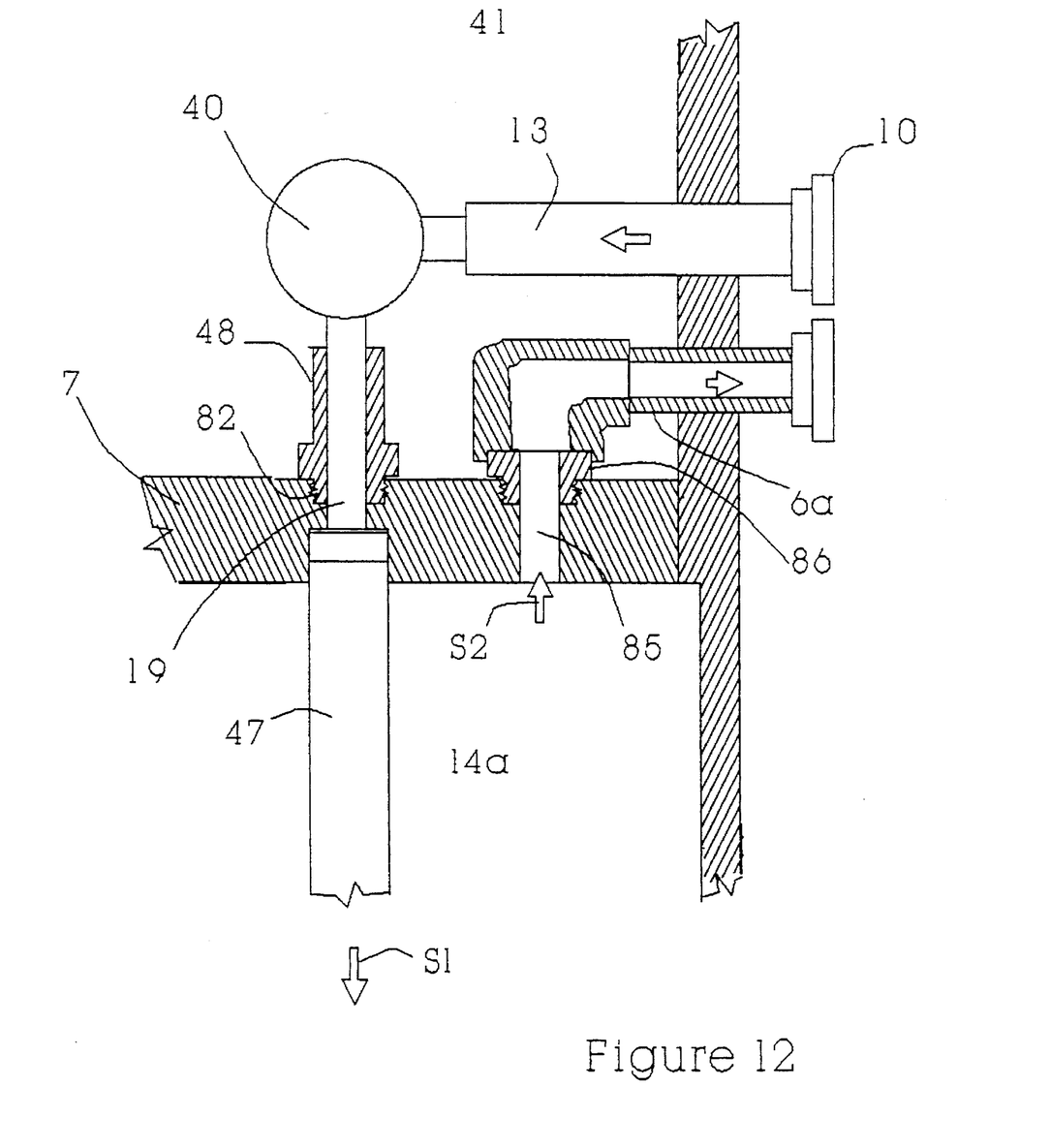
FIG. 12 is a partial cross-sectional view showing the piping arrangement of a modified embodiment of the invention.

An outlet 6 with a quick disconnect fitting 10 is near the top of lower chamber 14, between the internal bulkhead 7 and the top electrode plate 26 of the filter element sub-assembly 50, thus providing a means of egress from the lower chamber's discharge plenum 14a for cleaned solvent 52. In a modification of the present invention, the outlet piping 6a may alternatively extend from a fitting 86 in communication with a discharge opening 85 in the internal bulkhead 7, as illustrated in FIG. 12. An advantage of this modification of the invention is that it provides particularly strong structural support for the outlet piping 6a.

Figure 10:
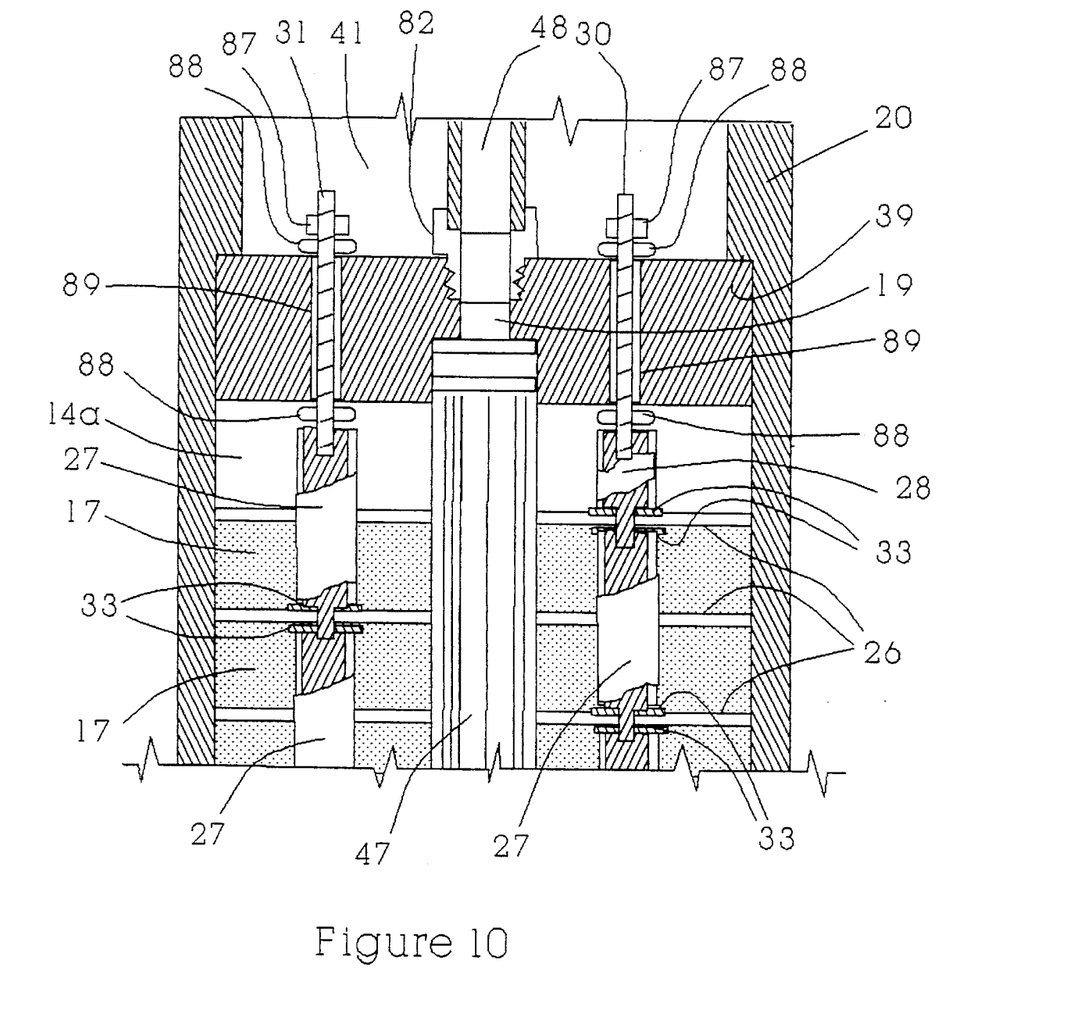
FIG. 10 is a partial cross-sectional view taken along the line 10—10 of FIG. 3.

Referring to FIG. 10, threaded electrical communication posts 30 and 31 pass through bulkhead holes 89 and are secured to the bulkhead 7 with nuts 87, and electrical conductors 28 and 27, respectively. The bulkhead holes 89 are sealed water tight by stainless steel-backed rubber washers 88.

Figure 4:
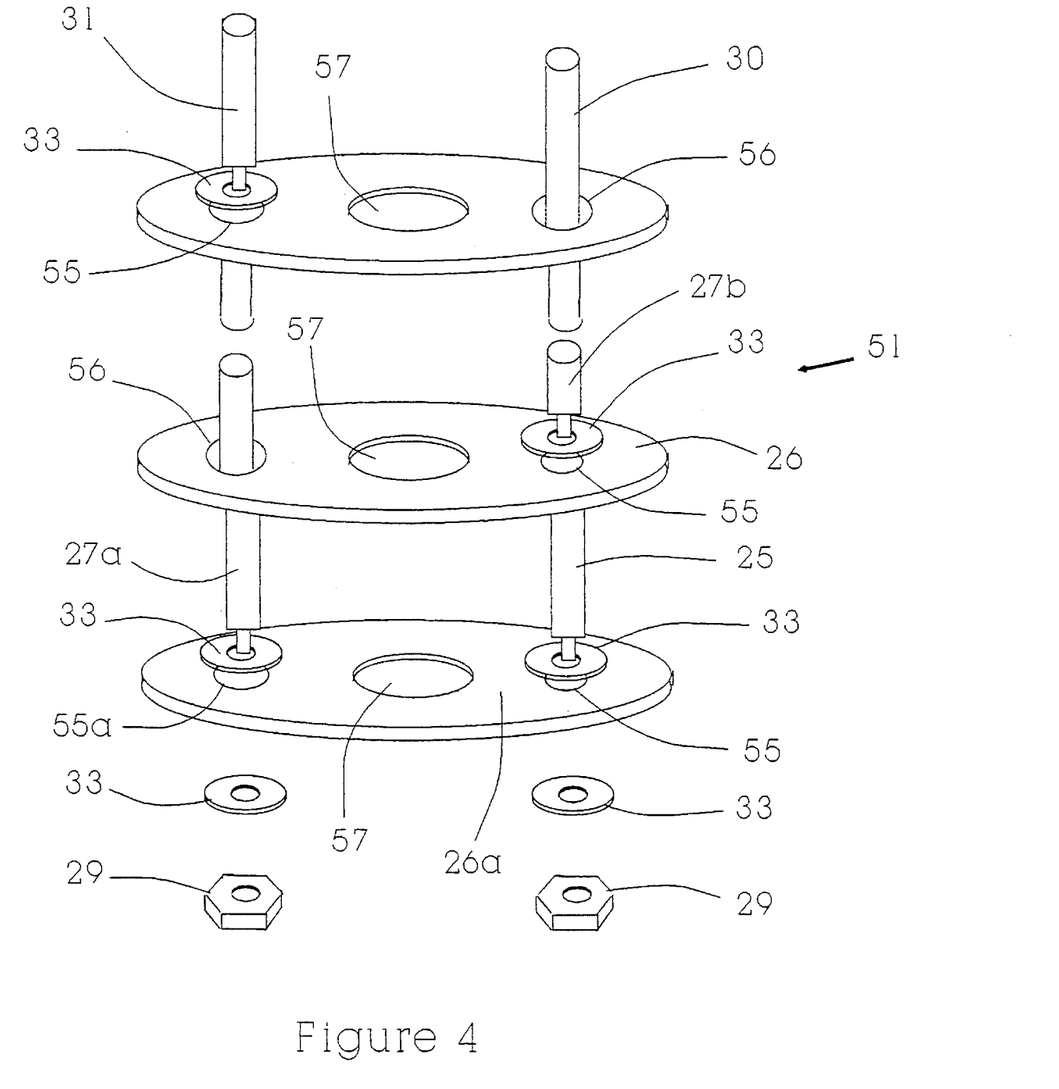
FIG. 4 is an exploded view showing the construction of the electrode plates of the present invention.
Figure 5:
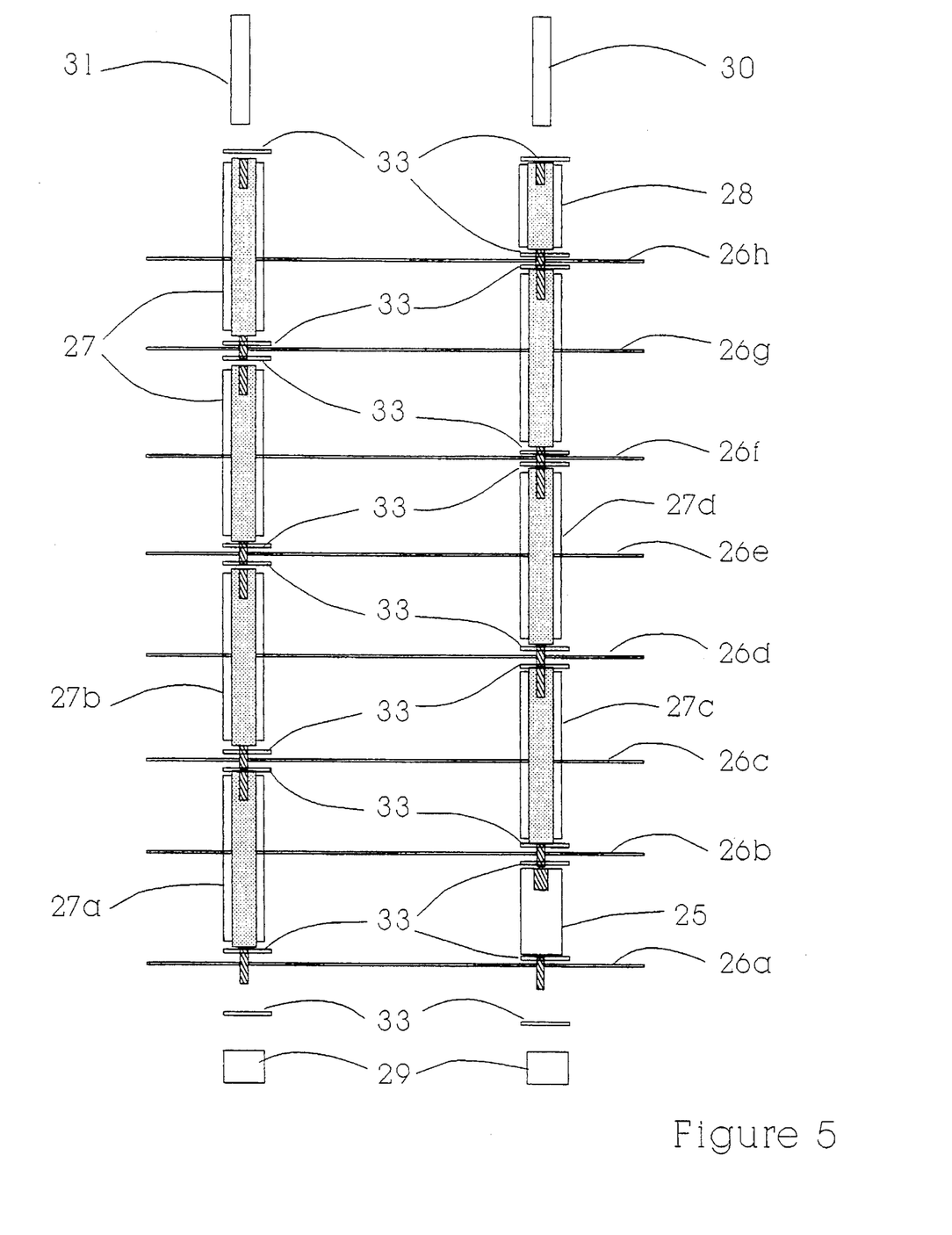
FIG. 5 is a side elevation showing the electrode plate sub-assembly of the present invention.

The electrode plate sub-assembly (generally designated as 51) is shown in FIGS. 4 and 5. Two-inch long electrical conductors 27 and one-inch long electrical conductors 28, are each insulated around their sides by shrink tubing 54, and are each threaded with female thread 52 on the top, and each have male thread 53 on their shouldered 58 bottom. A one-inch long Nylon spacer 25 is threaded with female thread 52 on the top, and with male thread 53 on its shouldered 58 bottom. The one-inch long electrical conductor 28, the two-inch long electrical conductors 27, and the Nylon spacer 25 are each hexagonal in cross-section and preferably 0.312" across the flats. The male threads 53 which protrude approximately ¼" beyond the bottom shoulder 58 of the conductors and spacer (25, 27 and 28) are each preferably less than ³⁄₁₆" outside diameter.

Each electrode plate 26 is constructed of a thin electrically conductive material. The electrode plate 26 may be constructed either of mesh or of perforated plate, but in any case, it must have sufficient open area to allow the solvent S1 to readily pass from one side of the plate to the other. In the preferred embodiment of the invention, the electrode plates 26 are constructed of 0.075" thick stainless steel mesh having an approximate open area of 50%. Each electrode plate 26 is provided with a first hole 57 at its center which is sufficiently large in diameter for the lower chamber piping 47 to pass through it. In the preferred embodiment of the invention, the lower chamber piping is constructed of ½" PVC pipe, and the first hole 57 in each of the electrode plates 26 is ⅝" diameter.

Each electrode plate 26 is also provided with a second hole 55 located eccentrically on the electrode plate. The second electrode plate hole 55 is preferably ³⁄₁₆" in diameter, which is sufficiently large to allow the male threads 53 of the conductors 27 and 28 to pass through, but too small to allow the shoulder 58 of the conductors 27 and 28 to pass through.

Each electrode plate 26 is also provided with a third hole preferably located eccentrically on the electrode plate opposite the second hole 55. On the bottom electrode plate 26a, the second and third holes 55 and 55a are the same diameter. On all the electrode plates 26 other than the bottom electrode plate 26a, the third hole 56 is sized large enough to allow the electrical conductors (27 or 28), as well as the insulative shrink tubing 54 to pass through. In the preferred embodiment of the invention, the third hole 56 on the electrode plates 26 (other than the bottom electrode plate 26a) is ⅜" diameter.

The corresponding three holes 55, 56 and 57 of each electrode plate 26 are in alignment with one another.

Referring to the bottom right of FIGS. 4 and 5, the male thread 53 on the shouldered bottom of the 1"-long Nylon spacer 25 passes through a small opening 55 in the bottom electrode plate 26a, and is secured thereto by a stainless steel hexagon nut 29 and washers; 33. Washer 33 has an inside diameter greater than the male thread 53 of the electrical conductors (27 and 28) but smaller than the outside diameter of the shoulder 58 of the electrical conductors (27 and 28). Being constructed of a non-conductive material, the Nylon spacer 25 may be viewed as being in mechanical, but not electrical, contact with the bottom electrode plate 26a.

Referring now to the bottom left of FIGS. 4 and 5, the male thread 53 on the shouldered bottom of a 2"-long insulated electrical conductor 27a passes through a second opening 55a in the bottom electrode plate 26a, and is secured thereto, both mechanically and electrically, by a stainless steel hexagon nut 29 and washers 33. The insulated electrical conductor 27a passes through an opening 56 in the second electrode plate 26b but, being insulated by shrink tubing 54, is not in electrical communication with the second electrode plate 26b.

A second 2"-long insulated electrical conductor 27b is threadedly secured to the top of the first electrical conductor 27a, and, with stainless steel washers 33, secures the assembled conductors 27a and 27b in electrical and mechanical contact with a third electrode plate 26c at hole 55.

Referring again to the right of FIGS. 4 and 5, the Nylon spacer 25, is securely threaded onto insulated electrical conductor 27c which penetrates washer 33, electrode plate 26b (at hole 55), and another washer 33, making electrical contact with the second electrode plate 26b. The electrical conductor 27b and the insulated shrink tubing 54 pass through the third electrode plate 26c (at hole 56) without electrical contact between the conductor 27b and the electrode plate 26c. Another 2"-long insulated electrical conductor 27d is threadedly secured to the top of electrical conductor 27c, and, with stainless steel washers 33, secures the assembled conductors 27c and 27d in electrical and mechanical contact with a fourth electrode plate 26d (at hole 55).

In the foregoing manner, a pattern of "charged" and "neutral" alternating electrical connections are established by the series of insulated conductors on the left and right sides of the electrode plate sub-assembly 51, respectively. By repeating this construction, alternating electrical connections are established which thus provide a stacked array of alternating charged (26a, 26b, etc.) and neutral (26b, 26d, etc.) electrode plates. This pattern is continued upwardly until the desired number of plates has been assembled, depending upon the properties of the various fluids to be cleaned. The electrode plate sub-assembly 51 terminates with electrical and mechanical connections to the electrical communication posts 30 and 31 on the underside of the bulkhead 7. The lengths of the assembled trains of conductors 27 on the right and left side of the electrode plate sub-assembly are made equal by the addition of one 1"-long insulated electrical conductor 28 secured to the electrical communication post 30.

Figure 11:
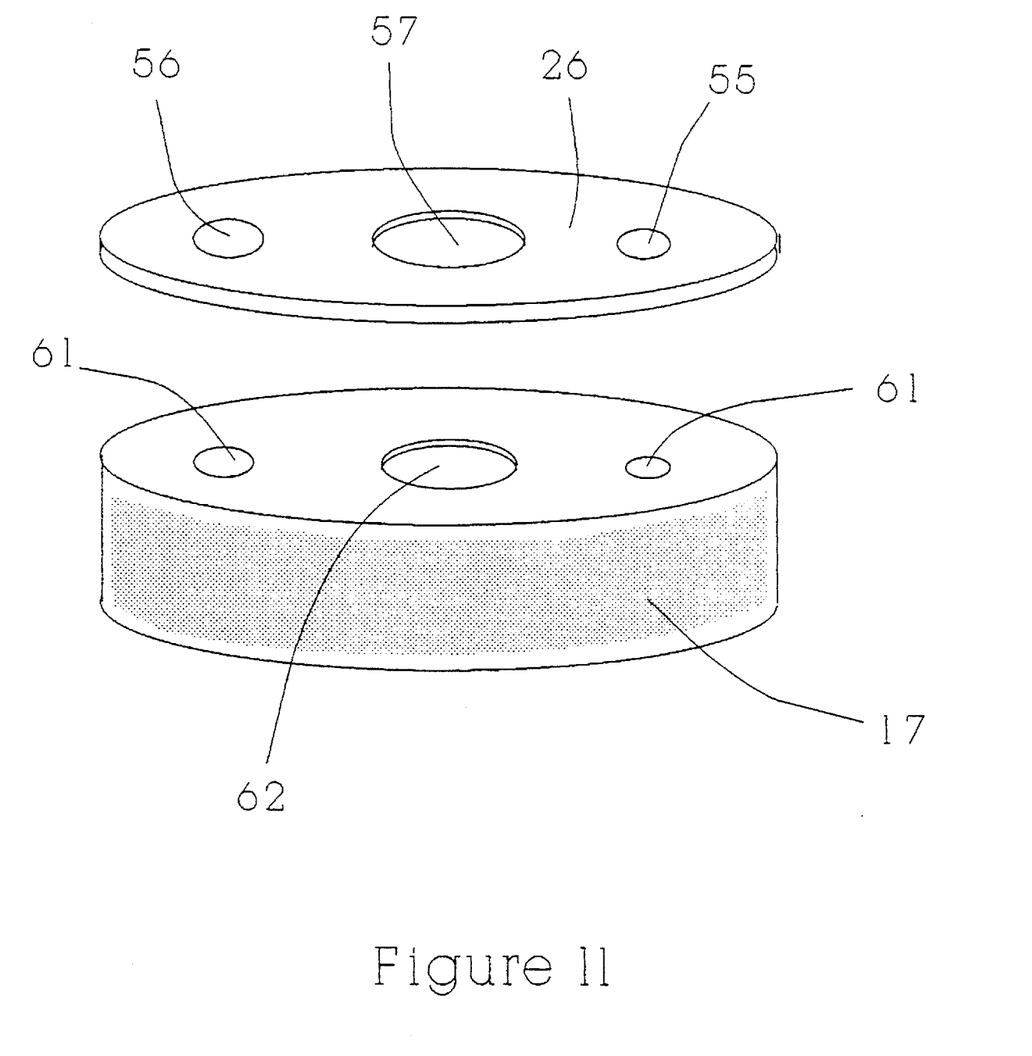
FIG. 11 is a perspective view showing the details of construction of the filter media discs and electrode plates of the present invention.

The filter element construction is illustrated in FIGS. 10 and 11. Between each of the electrode plates 26, there is disposed a filter media disc 17. In the preferred embodiment of the invention, the filter media disc 17 comprises articulated, compressible foam having, typically, 95 pores per inch. The filter media discs 17 are each preferably 1-inch thick (corresponding to the spacing of the electrode plates (26)), and are nominally constructed to have a diameter slightly greater than the inside diameter of the interior wall 32 of the housing. When installed inside of the lower chamber 14, the filter media discs 17, being compressible, press up against the cylinder wall 32, thus prohibiting solvents from bypassing the filter media by passing between the filter media discs 17 and the cylinder wall 32.

As illustrated in more detail in FIG. 11, the filter media discs 17 are each provided with two undersized holes 61 which are positioned so as to align with the electrical communication posts 30 and 31, so that all the insulated electrical conductors 27 may snugly pass through the filter media. In the preferred embodiment of the invention, the two holes 61 are nominally ⅛" in diameter, thus prohibiting solvents from bypassing the filter media 17 by passing between the (compressible) filter media 17 and the (0.312" hexagonal) electrical conductors 27. Each filter media disc 17 is also provided with an undersized central hole 62 which accommodates the lower chamber piping 47. In the preferred embodiment of the invention, the central hole 62 in the filter media discs 17 is nominally 7/16" diameter, thus prohibiting solvents from bypassing the filter media 17 by passing between the (compressible) filter media and the ½" nominal polyvinyl chloride piping 47.

OPERATION OF THE PREFERRED EMBODIMENT OF THE INVENTION

Referring now to FIG. 2, in its normal mode of operation, internal pump 40 causes contaminated fluid 51 to pass through quick disconnect 10, system inlet 13, sealed solvent channel 19 in bulkhead 7, and lower chamber piping 47 into the lower chamber 14 beneath the filter media discs 17 and electrode plates 26. The contaminated solvent moves laterally and upwardly (as indicated by arrows 53) through the porous filter media 17 and the (perforated or mesh) electrode plates 26.

The alternately charged electrode plates impart magnetic charges having defined polarity to the sub-micron sized particulate contaminants. As the sub-micron sized particulate contaminants become magnetically charged, a phenomenon known as "strawing" occurs. The oppositely charged ends of the sub-micron sized, particulate contaminants cause the individual particulates to become attracted to each other, ultimately causing them to become attached to each other and to form long chains, or "straws", of contaminated particles. Although the individual particulate contaminants may be of sub-micron size, the straws may reach several tens of thousands of microns in length. These long "straws" of particulate contaminants are easily (mechanically) removed from the solvent by the porous filter media discs 17. After passing through the entire bank of electrode plates 26 and filter media discs 17, the cleaned solvent S2 exits from the filter assembly 23 via the outlet 6.

Figure 6:
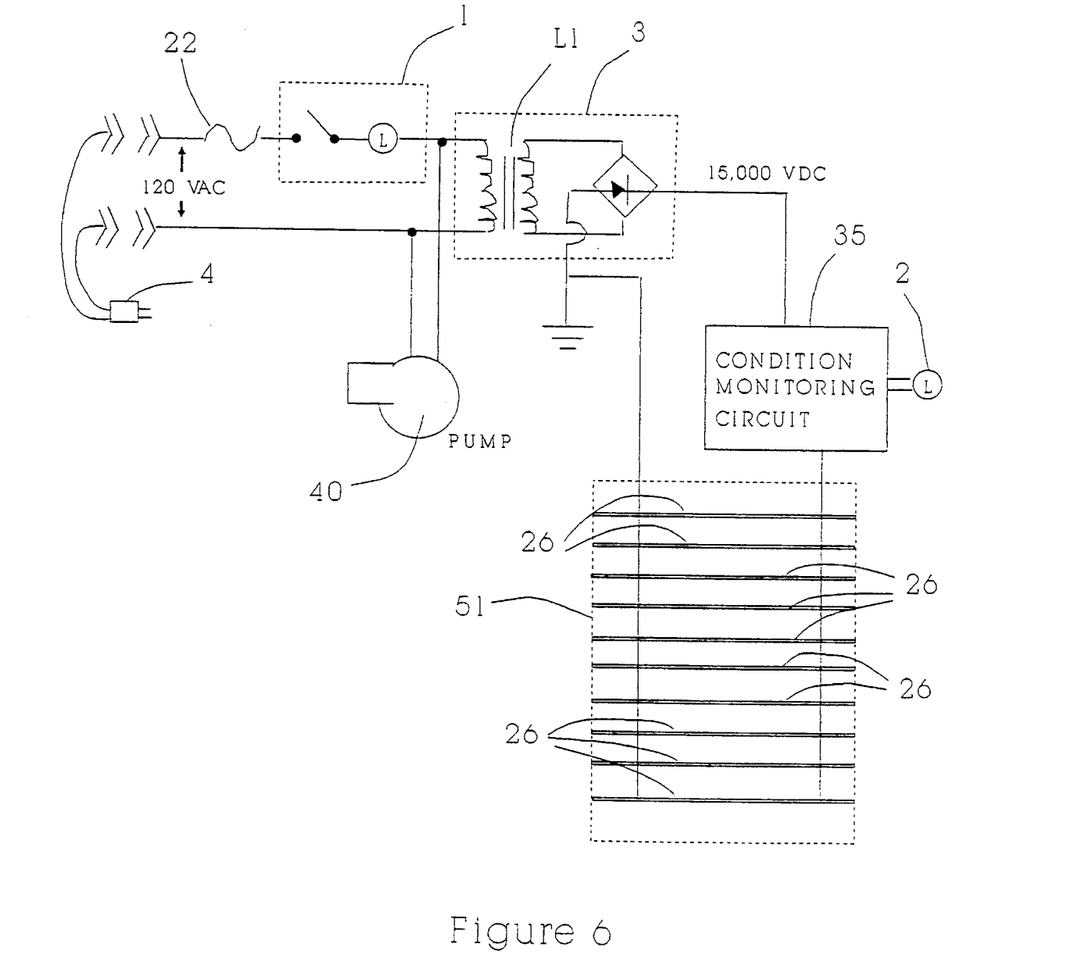
FIG. 6 is a schematic diagram showing the electrical circuit of the present invention.
Figure 7:
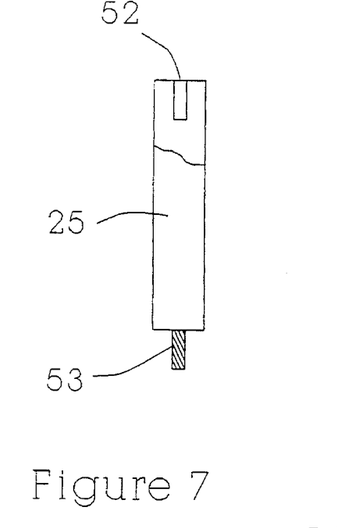
FIG. 7 is a medial cross-sectional view of the Nylon (polyamide polymer) spacer used in the preferred embodiment of the present invention.
Figure 8:
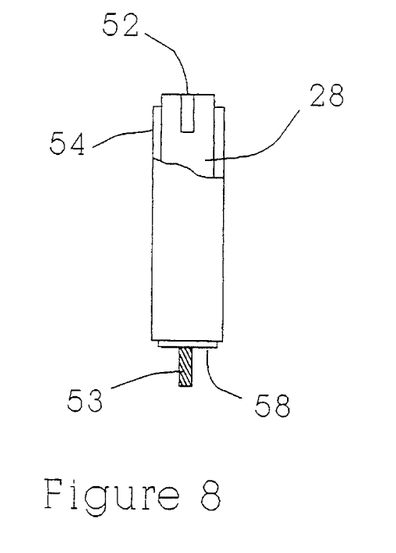
FIG. 8 is a medial cross-sectional view of the 1" electrical conductor used in the preferred embodiment of the present invention.
Figure 9:
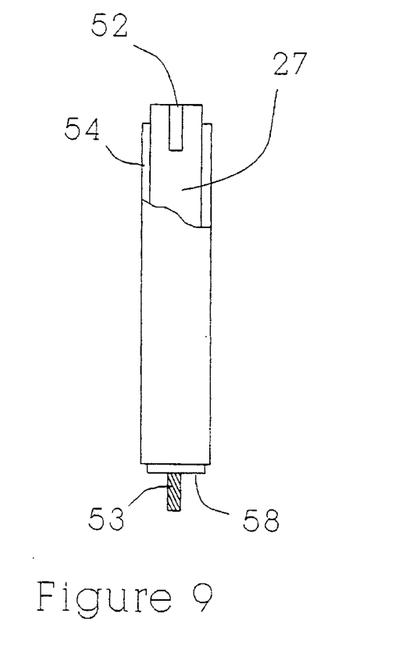
FIG. 9 is a medial cross-sectional view of construction of a 2" electrical conductor used in the preferred embodiment of the present invention.

Referring now to FIG. 6, in the preferred embodiment of the invention, a charge of 15,000 Volts (DC) is applied to the electrode plates 26. The electrical connections necessary to generate high voltage for the alternating filter electrode plates 26 is provided by a transformer L1 in the power supply 3. In the preferred embodiment of the invention, 120 VAC electrical energy is provided to the power supply 3. The power light 1 illuminates when switched to the "on" position and remains illuminated as long as the filter assembly is energized.

A condition monitoring circuit 35 determines the efficiency of the filtration system by measuring the amount of current flow to the electrode plates 26. As the (nominally non-conductive) filter media discs 17 become increasingly contaminated with filtered particulates, more energy is necessary to maintain a charge at the electrode plates 26. A condition light 2 in communication with the condition monitoring circuit 35 constantly glows green when filtration is being maximized (as determined by the condition monitoring circuit 3). When the filter media 17 becomes clogged with contaminants, this results in an increased demand for electrical current to the electrode plates 26, which is detected by condition monitoring circuit, and which in turns causes the condition light 2 no longer glow, thus indicating that it is time to clean or replace the filter media discs 17.

The filter media discs 17 may be cleaned simply by reversing the direction of flow ("back flushing") of solvent through the filter assembly 23. The simple back flushing procedure is accomplished by removing the supply and discharge hoses to the filter assembly 23 (not shown) from the quick disconnects 9 and 10, and applying high pressure air directly to the outlet piping 6. Blasts of dry conditioned air (up to 40 psi), injected via an air hose (not shown) connected to disconnect 11 at the outlet 6, forces contaminant debris down through the filter pack, upwardly through the lower chamber piping 47, out of inlet 13, quick disconnect 10 and into waste oil recovery tank (not shown). Once the contaminated debris has been forced out of the filter, contamination removal filtration can begin again. If the back flushing procedure sufficiently unclogs the filter media 17, the condition light 2 will again glow green when the unit is re-energized, indicating filtration efficiency now can be maximized.

When the filter media 17 becomes too clogged up to be adequately cleaned by back flushing, the used filter media discs 17 can be replaced by the following procedure. With power to the unit shut off, the lower end cap 15 can be removed from the housing 20 simply by unscrewing it. When the lower end cap 15 is removed, the bottom of the stack of filter media discs and electrode plates (17 and 26) is exposed. The stainless steel hex nuts 29 and bottom washers 33 may be removed by unscrewing the nuts 29 from the male threads 53. With the nuts 29 and washers 33 removed, the lower-most (i.e. exposed) electrode plate 26a can be manually removed by reaching into the open bottom of the housing 20. With the electrode plate 26a removed, the lower-most (i.e. exposed) filter media disc 17 can be manually removed from the cylinder housing 20. Subsequent electrode plates 26 and filter media discs 17 can be removed, in turn, by unscrewing the conductors 27 as they become exposed with the removal of each filter media disc 17. In a reverse fashion, new (i.e. replacement) filter media discs 17 can be installed into the lower chamber 18 and the filter apparatus can be re-assembled.

It will be understood from the above description that the internal bulkhead 7 seals the lower chamber 14 from the upper chamber 41, and thereby effects a "wet" chamber at the bottom (i.e. the lower chamber 14) of the device and a "dry" chamber (i.e. the upper chamber 41) at the top of the device. With the top cap 21 and the bottom cap 15 in place, the entire filter assembly 23 is sealed from outside contamination, except by the solvent 51 which enters via inlet 13.

The arrangement of the filter media discs 17 disclosed is optimum for the filtration of solvent. Through varying degrees of separation between adjacent electrode plates 26 and the use of fewer or more electrode plates 26, optimum filtration can be accomplished for many different fluids.

With the addition of different pumps, various viscosities of fluids dan be cleaned with the disclosed electrostatic filter invention.

It will be appreciated from a review of the above disclosure that a filter apparatus constructed in accordance with the present invention can be easily maintained by two methods, namely: back flushing and filter media disc replacement. It will be appreciated that the former method (back flushing) provides a means to clean the filter media without necessitating disassembly of the filter apparatus.

It will further be appreciated that when it becomes necessary to replace the filter media discs 17, such replacement can be easily accomplished without disconnecting the filter apparatus from inlet and outlet piping. In addition, it will be understood that the described procedure for replacing filter media discs does not necessitate exposure of the control circuitry or and moving components (eg. the pump) of the apparatus. In fact, it should be understood that all components inside of the upper chamber 14 remain clean, dry, and protected from environmental exposure at all times during normal operation of the filter apparatus as well as during back flushing and filter media replacement operations.

It will also be appreciated by those skilled in the art that a filter apparatus constructed in accordance with the present invention provides a highly efficient means of filtering contaminated solvent due, in part, to the fact that the contaminated solvent cannot bypass the filtering media. In particular, it is understood that because the individual electrode plates are supported by electrical conductors (27 and 28) which are tightly held against the filter media on all vertical sides of the conductors, the solvent cannot bypass the filter media in the vicinity of the conductors.

It will also be appreciated by those skilled in the art that because of the sectional, or incremental, construction of the filter media discs 17, the electrode plates 28 and the electrical conductors 27, the present invention can be constructed (or may be modified) to accommodate filter media discs of varying porosity, material, and thickness, and varying numbers (i.e. total stack height) of discs and electrode plates. Accordingly, it will be understood that it is within the scope of this invention to use filter media discs 17 having, for example, large openings near the bottom of the lower chamber 14 and relatively smaller openings near the top of the chamber, thus facilitating relatively higher flow rates while filtering out relatively large particulates at the bottom and relatively small contaminants near the top of the device.

Although specific applications, material, components, connections, sequences of events, and methods have been stated in the above description of the preferred embodiment of the invention, other suitable materials, other applications, components and process steps as listed herein may be used with satisfactory results and varying degrees of quality. In addition, it will be understood that various other changes in, details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention as hereinafter claimed.

We claim:

1. A filter assembly comprising:

a housing member, said housing member having a top end and a bottom end, and a substantially cylindrical exterior wall, and said housing member is constructed of an electrically non-conductive material;

means for temporarily closing said top end of said cylindrical housing member;

said means for temporarily closing said top end of said cylindrical housing member comprising a first cap member;

means for temporarily closing said bottom end of said housing member;

said means for temporarily closing said bottom end of said housing member comprising a second cap member;

a water-tight bulkhead member secured to said housing member disposed intermediately between said top end and said bottom end of said housing member;

a first chamber interior to said housing member extending from said bulkhead member to said first cap member;

said housing member further comprising a substantially cylindrical first interior wall surrounding said first chamber;

a second chamber interior to said housing member extending from said bulkhead member to said second cap member;

said housing member further comprising a substantially cylindrical second interior wall surrounding said second chamber;

fluid inlet means;

said fluid inlet means comprising first conduit means extending from the exterior of said housing member into said first chamber and second conduit means extending from said first conduit means inside of said first chamber into said second chamber;

said second conduit means comprising a substantially straight, electrically non-conductive first pipe member having a first end and a second end;

fluid outlet means;

said fluid outlet means comprising third conduit means extending from said second chamber to the exterior of said housing member;

a plurality of parallel porous electrode plate members disposed inside of said second chamber perpendicular to said second interior wall;

particulate screening means disposed between each of said plurality of electrode plate members;

said particulate screening means comprising a porous disc member;

first, second and third electrode plate openings in each of said electrode plate members, each of said second electrode plate openings are larger than said third electrode plate openings;

first, second and third disc openings in each of said porous disc members, each of said second disc openings are larger than said third disc openings;

wherein said first pipe member extends through said first electrode plate first opening in each of said electrode plate members and through said first disc opening in each of said porous disc members;

and further comprising means for supporting said plurality of electrode plate members from said bulkhead member;

wherein said means for supporting said plurality of electrode plate members from said bulkhead member comprises;

a first conductor member attached to said bulkhead member and extending through said bulkhead member from said first chamber to said second chamber;

a second conductor member attached to said bulkhead member and extending through said bulkhead member from said first chamber to said second chamber;

a plurality of electrically conductive rigid connector members, each of said connector members having a first end and a second end and an elongated body portion, each said elongated body portion is surrounded with insulation, and the first end of each of said connector members having a female thread and the second end of each of said connector members having a male thread;

wherein a first of said connector members is in electrical communication with said first conductor member and is secured to and in electrical communication with a first of said electrode plate members, and the second end of said first connector member passes through the third opening in said first electrode plate member;

and wherein the second end of said first connector member is secured to the first end of a second of said connector members;

and wherein said second connector member is secured to and in electrical communication with a third of said electrode plate members, and the second end of said second connector member passes through the third opening in said third electrode plate member;

and wherein a third of said connector members is in electrical communication with said second conductor member and is secured to and in electrical communication with a second of said electrode plate members, said second electrode plate member is disposed between said first electrode plate and said third electrode plate, and wherein the second end of said third connector member passes through the third opening in said second electrode plate member;

and wherein the second end of said third connector member is secured to the first end of a fourth of said connector members;

and wherein said fourth connector member is secured to and in electrical communication with a fourth of said electrode plate members, and the second end of said fourth connector member passes through the third opening in said fourth electrode plate member;

and wherein said elongated rigid body portion of said second connector member passes through said second opening in said second electrode plate member;

and wherein said elongated rigid body portion of said third connector member passes through said second opening in said first electrode plate member;

and wherein said elongated rigid body portion of said fourth connector member passes through said second opening in said third electrode plate member;

and wherein said second end of said first pipe member opens into said second chamber.

2. The invention according to claim 1 wherein said porous disc member has an outside diameter at least as great as the diameter of said cylindrical second interior wall and an axis parallel to second interior wall.

3. The invention according to claim 1 further comprising fluid pumping means in communication with said first conduit means.

4. The invention according to claim 3 wherein said fluid pumping means comprises a fluid pump member disposed within said first chamber.

5. The invention according to claim 1 further comprising an electrical power supply means in communication with said first and second conductor members, wherein said electrical power supply means comprises an electrical transformer member disposed within said first chamber.

6. The invention according to claim 1 further wherein said second cap member threadedly engages with said bottom end of housing member.

7. The invention according to claim 6, wherein said second chamber includes a reservoir between said plurality of electrode plate members and said second cap member, said second end of said first pipe member opening into said reservoir.

8. The invention according to claim 1 wherein the diameter of said cylindrical second interior wall is greater than the diameter of said cylindrical first interior wall.

9. The invention according to claim 1 wherein said third conduit means intermediately passes through said first chamber.

10. The invention according to claim 1 further comprising contaminant screening efficiency means comprising:

current measuring means disposed within said first chamber; and visual or audible indicator means in communication with said current measuring means.

* * * * *